United States Patent [19]

Alcidi

[11] Patent Number: 4,612,443

[45] Date of Patent: Sep. 16, 1986

[54] METHOD AND DEVICE TO OVERCOME THE PILE-UP EFFECT IN SCINTILLATION COUNTERS

[76] Inventor: Mario Alcidi, Via Michelazzi 24, Florence, Italy

[21] Appl. No.: 695,116

[22] Filed: Jan. 25, 1985

[30] Foreign Application Priority Data

Jan. 27, 1984 [IT] Italy ................................ 9322 A/84

[51] Int. Cl.<sup>4</sup> ............................................. G01T 1/208
[52] U.S. Cl. .................................... 250/362; 250/369; 250/363 R
[58] Field of Search ........... 250/369, 363 SE, 363 SR, 250/363 R, 362; 328/109, 56, 157

[56] References Cited

U.S. PATENT DOCUMENTS

| | | | |
|---|---|---|---|
| 3,102,954 | 9/1963 | Richardson et al. | 250/369 |
| 3,525,047 | 8/1970 | Schwartz | 250/369 X |
| 4,305,042 | 12/1981 | Tanaka et al. | 328/162 |

*Primary Examiner*—Janice A. Howell
*Assistant Examiner*—Constantine Hannaher
*Attorney, Agent, or Firm*—Mark H. Jay

[57] ABSTRACT

To overcome the pile-up effect in a scintillation detection system, in particular in a scintillation counter, electrical pulses leaving the scintillation detection system are passed through a first and a second circuit line. In the first line, they are not changed with respect to shape and time. In the second line, they are corrected with a delay of the wave front rise. The output signal of the second line is subtracted from the output signal of the first line such that the contribution of any previous pulse that precedes by a short period of time is subtracted from the amplitude of each pulse. The delay is achieved, for example, by inserting a rapid amplifier in the first line, and a slow amplifier or a low pass filter in the second line. The subtraction is achieved e.g. by means of a rapid differential amplifier.

19 Claims, 20 Drawing Figures

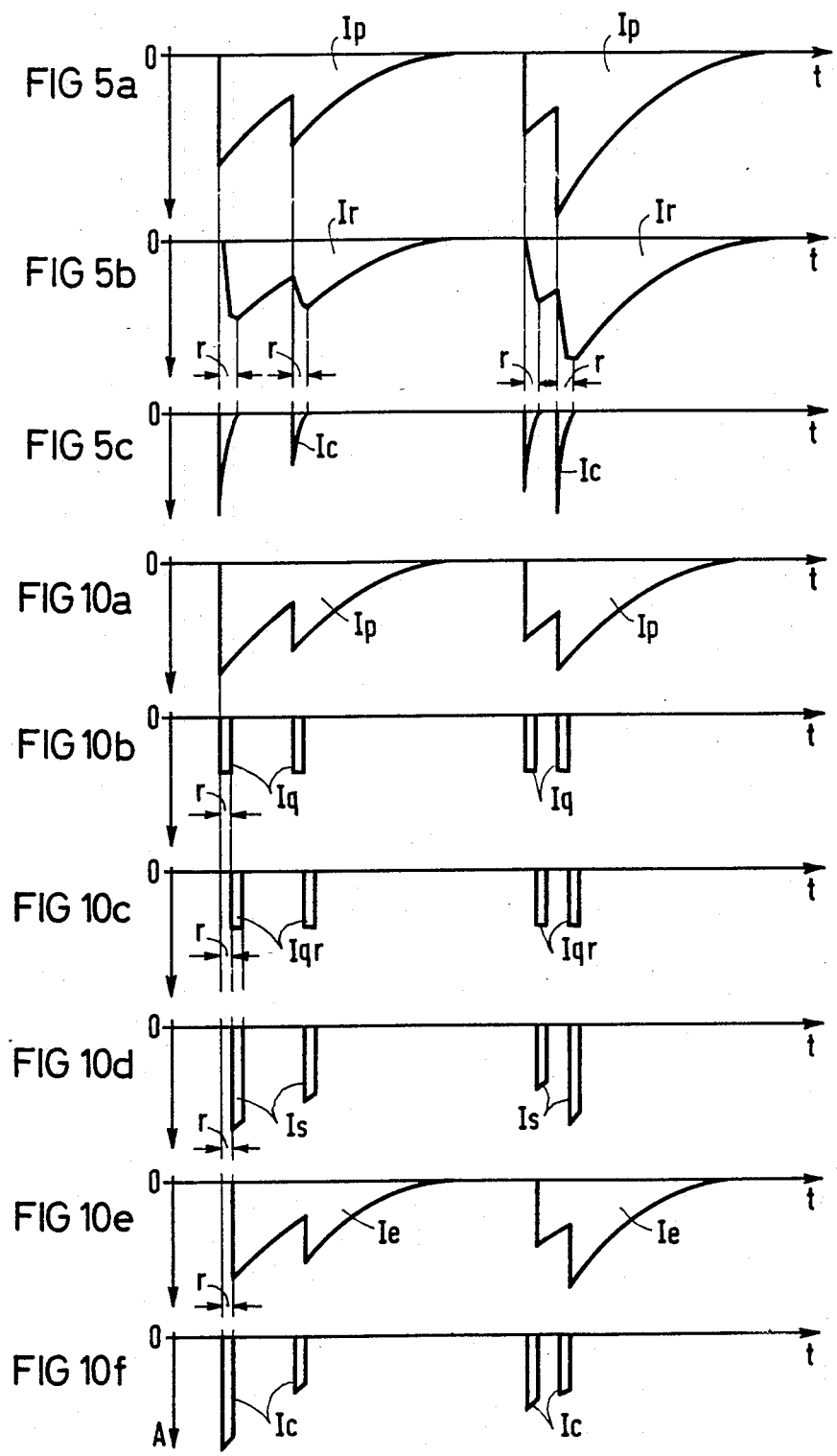

METHOD AND DEVICE TO OVERCOME THE PILE-UP EFFECT IN SCINTILLATION COUNTERS

BACKGROUND OF THE INVENTION

1. Field of the Invention

This invention refers to a novel method to overcome the pile-up effect in a scintillation detection system, particularly in a scintillation counter. It also refers to a device to carry out said method. Generally spoken, this invention relates to a method and a device for detecting scintillation occurrences. The invention may find its application in a scintillation counter, particularly in counting X-ray or gamma radiation, and in the field of nuclear medicine.

2. Description of the Prior Art

It is known that in measurements of electromagnetic X-ray radiation or gamma radiation using a scintillation crystal, one of the most important causes of error is an effect known as pile-up effect. While the error due to such a pile-up effect is negligible at low counting rates, it increases as the radiation beam increases until it interferes with the measurement at high counting rates.

As is known, the energy applied to a scintillation crystal by an X-ray or gamma photon is returned in the form of flashes of light. These flashes of light are conventionally converted into current pulses in a photomultiplier, and the said pulses extinguish themselves in a period of time which is in the order of microseconds. The so-called pile-up effect occurs whenever a new pulse is detected in the scintillator crystal and photo multiplier arrangement before the previous pulse has become extinguished. Naturally, the incidence of this effect is correlated to the counting rate. Hence the probability of its occurrance is all the greater the higher the pulse rate is.

In the field of nuclear medicine, the problem of the pile-up effect is particularly serious, since the spectrometry precision of the incident radiation conditions the scintigraphy results with scintillation chambers, i.e. the method by which radioactivity distribution maps are obtained. In fact, the pileup effect also causes spatial distortion and a significant worsening of the image resolution.

Scintillation chambers known to-date to obtain scintigraphies are frequently equipped with devices to off-set the pile-up effect. In the majority of cases these devices are based on the principle of executing the derivative before (from) the original signals. This principle makes it possible to remove only a limited and inconstant part of the contribution due to the pile-up effect, or to disregard the piled-up pulses, thereby reducing the efficiency of the system.

SUMMARY OF THE INVENTION

1. Objects

It is an object of this invention to overcome the pile-up effect by a new method which originates from a critical analysis of the radiation detection process.

It is another object of this invention to provide circuitry to carry out the new method of reducing or eliminating the pile-up effect.

It is still another object of this invention to increase the maximum counting rate in a scintillation counter or a scintillation camera.

2. Summary

In accordance with this invention, the pile-up effect can be overcome by subtracting the contribution or influence of a previous or immediately preceding pulse or of previous pulses from the amplitude of each pulse which is derived from the scintillation detection system, in particular by effecting the subtraction between the original signal and a signal which is equal or analogous to the previous one, but which has a delay of the wave front rise. This delay should be small with respect to the pulse width. It may be in the range of several nanoseconds (nsec) for a scintillation counter.

According to this invention, a first embodiment of circuitry for implementing this method comprises (a) a rapid amplifier for receiving said electrical pulses and for generating first amplified output signals, (b) a slow amplifier for receiving said electrical pulses and for generating second amplifier output signals, said second output signals having a delay with respect to said first output signals, and (c) a rapid differential amplifier for receiving said first and second output signals and for subtracting said second output signals, said rapid differential amplifier thereby generating a differential output signal.

According to this invention, a second embodiment of circuitry for implementing this method comprises (a) a rapid amplifier for receiving said electrical pulses and for generating first amplified output signals, (b) a series connection of a delay member and a rapid amplifier for receiving said electrical pulses and for generating second amplified output signals, said second output signals having a delay with respect to said first output signals, and (c) a rapid differential amplifier for receiving said first and second output signals and for subtracting said second output signals, said rapid differential amplifier thereby generating a differential output signal.

In both embodiments, the differential output signal may be supplied to an electrical counter.

The new method and the simple circuitries just described lend themselves to the attainment of high counting frequencies without the pile-up effect. The spectra obtained have a marked separation between the photoelectric peak and the Compton quanta.

The foregoing and other objects, features and advantages of the invention will be apparent from the following more particular description of preferred embodiments of the invention, as illustrated in the accompanying drawings. These drawings are not to be considered in a limitative sense.

Like elements and features are referred to by like numerals and symbols throughout the drawings.

BRIEF DESCRIPTION OF THE DRAWINGS

In the drawings:

FIG. 5a represents a series of pulses Ip with the pile-up effect;

FIG. 5b represents a series of pulses Ir which are the pulses of FIG. 4a, but subject to a delay r, said pulses Ir being achieved in accordance with the circuit arrangements of FIG. 1;

FIG. 5c represents pulses Ic resulting from the difference between the pulses Ip of FIG. 5a and the pulses Ir of FIG. 5b, said difference being achieved with the circuit arrangements of FIG. 1;

FIG. 10a represents a series of pulses Ip showing a pileup effect;

FIG. 10b represents a series of square pulses Iq corresponding to the apexes of the pulses of FIG. 10a;

FIG. 10c represents a series of square pulses Iqr, equal to the pulses Iq of FIG. 10b, but provided with a delay r;

FIG. 10d represents a series of sample pulses Is with an amplitude equal to the pulses Ip of FIG. 10a;

FIG. 10e represents a series of exponential pulses Ie generated by the pulses Is of FIG. 10d; and FIG. 10f represents the pulses Ic resulting from the difference between the Ip and Ie pulses of FIGS. 10a and 10f, respectively.

DESCRIPTION OF THE PREFERRED EMBODIMENTS

Figure 1B:
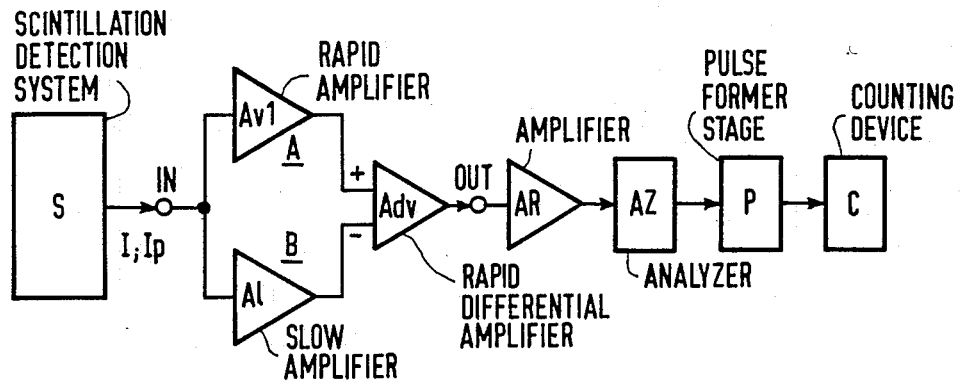
FIGS. 1a and 1b represent block circuit diagrams of a device for detecting scintillation occurrences in accordance with this invention.
Figure 1A:
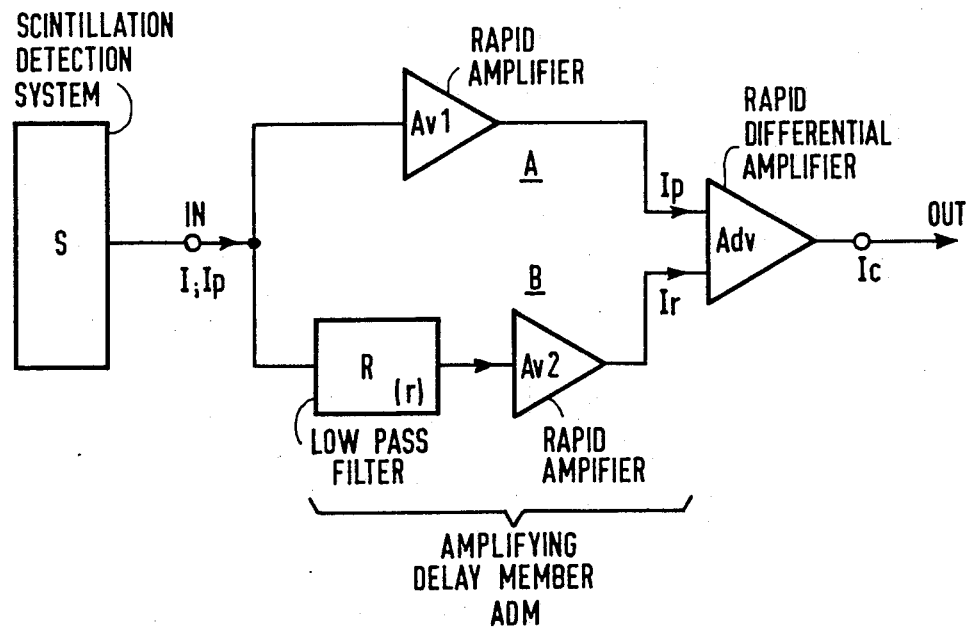

In each of the block diagrams of FIGS. 1a and 1b, a scintillation detection system S is illustrated. Such system S may essentially comprise a scintillation crystal (not shown) which is exposed to high energy radiation such as X-ray radiation or gamma radiation. The scintillation crystal emits flashes of light in response to the impinging high energy radiation. At least one photomultiplier (not shown) may be associated with the scintillation crystal. The photomultiplier serves to detect the afore-mentioned flashes of light. In response to and in accordance with such light flashes, the photomultiplier generates electrical pulses at its output. A system S of this nature is well-known to those skilled in the art. Therefore, it seems not to be necessary to detail more features of such system S. It should be stressed, however, that the system S may be part of a conventional scintillation counter or of a conventional scintillation camera, in particular a gamma camera. Scintillation cameras are widely used in the field of nuclear medicine.

Figure 2:
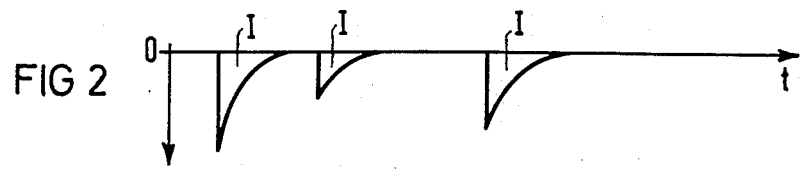
FIG. 2 represents a series of pulses I without pile-up effect resulting from a scintillation detection systems as illustrated in FIG. 1.
Figure 3:
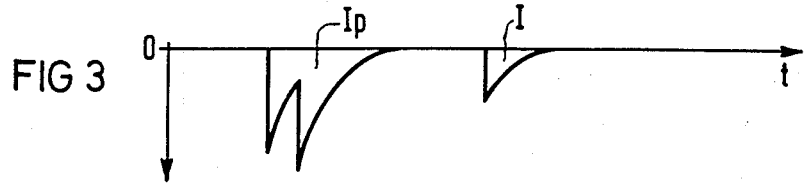
FIG. 3 represents a series of pulses Ip and I with and without the pile-up effect, respectively.

A scintillation detection system S of the type considered here issues series of pulses in response to impinging high energy radiation. FIG. 2 illustrates typical series of pulses I having no overlap. However, if an overlap occurs between adjacent pulses, the pulse distribution may take the form of FIG. 3. In this example, the first two pulses I are located that close together that they form a pile-up pulse Ip. It is well-known that such pile-up pulses interfere with the accuracy of a detecting system for scintillation occurances.

Figure 4A:
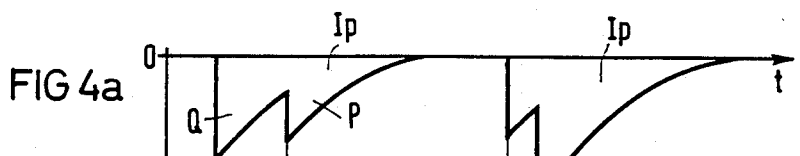
FIG. 4a represents a series of pulses Ip with the pile-up effect.
Figure 4B:
FIG. 4b represents a series of pulses Ir which are equal to the pulses Ip of FIG. 4a, but which a reprovided with a delay r.
Figure 4C:
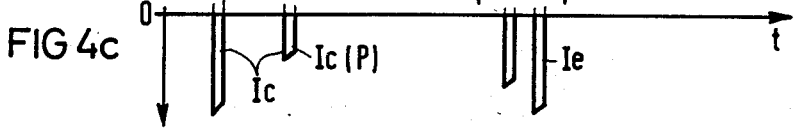
FIG. 4c represents pulses Ic resulting from the theoretical difference between the pulses Ip of FIG. 4a and the pulses Ir of FIG. 4b.

The circuit arrangements illustrated in FIGS. 1a and 1b overcome the undesired pile-up effect. The method that achieves this goal may be best understood by first considering FIGS. 4a, 4b and 4c. In FIGS. 4a, 4b and 4c, the method is reduced to its essential features.

With reference to FIG. 4 of the annexed drawings, the method of totally overcome the pile-up effect in scintillation counters conforming to the invention consists in making the pile-up pulses Ip (FIG. 4a) leaving the scintillation detection system S transit through a first circuit line A, and making the same pulses Ip pass in a second circuit line B, where they are corrected with a predetermined delay r of the wave front rise by several nanoseconds (nsec). The delay r is much smaller than the pulse width. The delayed pulses are identified by Ir (FIG. 4b). Then the output signal Ir of the second line B is subtracted from the output signal Ip of the first line A in such a way that the contribution of the previous pulse or pulses is subtracted from the amplitude of each pulse Ip. The pulses Ic resulting from such subtraction procedure are illustrated in FIG. 4c of the annexed drawings. For instance, consider the second pulse P contained in the first overlapping double pulse Ip in FIG. 4a. The contribution of the immediately preceeding pulse Q (or previous pulses Q) is subtracted, as can be seen from FIG. 4c. The pulse identified by Ic(P) has a corrected amplitude, as compared to pulse P in FIG. 4a. Even though pulse P is "piled-up" on pulse Q in FIG. 4a, pulse Ic(P) has a corrected amplitude and can now be analyzed.

The method depicted in FIGS. 4a, 4b and 4c is the basis for the following explanation. While FIG. 4 gives a theoretical presentation, FIG. 5 yields a good approximation which can be achieved by readily available hardware components.

A device to achieve the said method conforming to the invention is shown in FIG. 1a of the attached drawings. The device essentially consists of a ring circuit including a first circuit line A with a first rapid amplifier Av1, and a second circuit line B with an amplifying delay member ADM. This member ADM may specifically be a series connection of a low pass filter R, providing a delay r for the wavefront rise, and a rapid amplifier Av2. The amplifiers Av1 and Av2 are fast preamplifiers. They may be of the same type and design, e.g. implemented as conventional semiconductor differential amplifiers. The outputs of the two circuit lines A and B are connected to the input of a rapid differential amplifier Adv, so that the pulses Ic obtained at the output of the differential amplifier Adv have a duration equal to the delay r of the wave front rise defined by the second circuit line B and an amplitude equal to the difference between the amplitude of the pulses Ip and the contribution of the pile-up effect. This is illustrated in FIGS. 5a, 5b, 5c of the attached drawings.

According to the embodiment of FIG. 1b, the electrical pulses I, Ip derived from the system S are again supplied to a first and a second branch or circuit line A and B, respectively. The first circuit line A contains also a rapid amplifier Av1 which generates first amplified output signals in response to the arriving pulses. The second circuit line B contains also an amplifying delay member which takes here the form of a slow amplifier A1. this slow amplifier A1 generates second amplified output signals in response to the arriving pulses I, Ip. Due to its structure, these pulses experience a delay r in th rising time of their wavefronts, as explained in connection with FIG. 1a. The amplified signals of the circuit lines A, B are fed into a rapid differential amplifier Adv. In order to process the difference pulses Ic (see FIG. 5c), the output of the amplifier Adv is connected to a series connection of an amplifier AR, an analyzer AZ, a pulse former stage P, and a counting device C. Counting device C counts the pulses derived from system S with high accuracy and velocity, even if pile-up pulses occur.

In order to verify the operation of the circuit realized as described in connection with FIG. 1a, a probe with a 2×2 inch sodium iodide crystal activated with thallium was exposed to a beam of gamma radiation emerging from a Technatium 99 m source (140 KeV gamma radiation).

Figure 6:
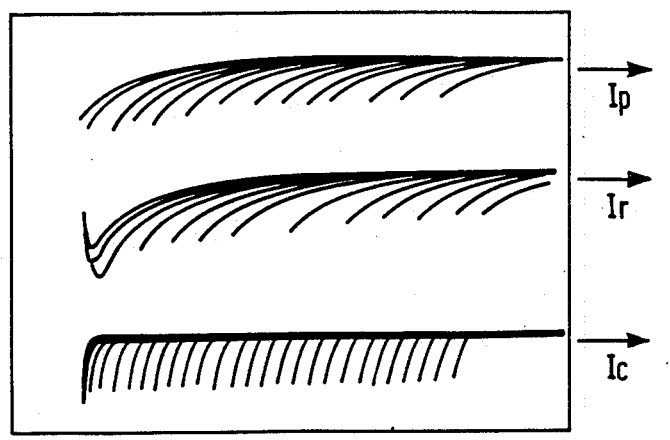
FIG. 6 represents an oscillogram corresponding to the pulses Ip-Ir and Ic, according to the diagram of FIG. 1.

The oscillogram of FIG. 6 shows the circuit operation. The pulses Ip originating from the scintillation probe S through the first line A are represented in the upper part, the pulses originating through the second line B are shown in the center, and the pulses Ic corrected by the circuit are represented in the lower part.

Figure 7:
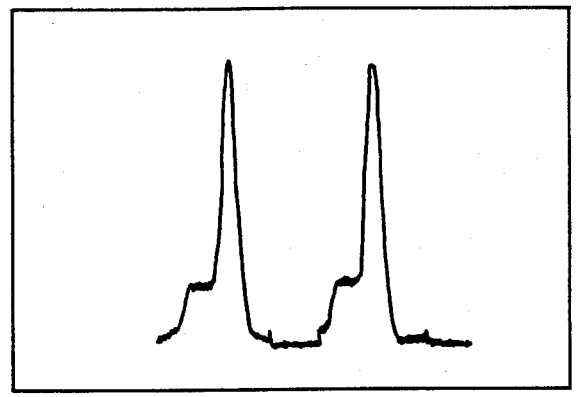
FIG. 7 represents a spectrum corresponding to pulses Ip and Ic obtained with a Technatium 99 m low counting rate source.

The spectra of FIG. 7 were obtained with a low counting frequency Technitium 99 m source; the left side spectrum of FIG. 7 refers to uncorrected pulses Ip, and the right side spectrum of FIG. 7 refers to corrected pulses Ic.

Figure 8:
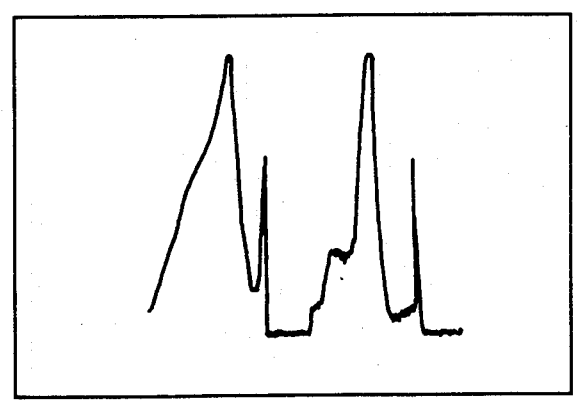
FIG. 8 represents a spectrum corresponding to pulses Ip and Ic obtained with a source with a higher activity than in FIG. 7 in the saturation condition of a conventional measuring system.

The spectra of FIG. 8 were obtained with a source of a higher activity than Technetium 99 m, in saturation conditions of the conventional measuring system. The left side spectrum refers to uncorrected pulses Ip, and the right side spectrum refers to corrected pulses Ic.

It will be noted that already at a low counting frequency (see FIG. 7) the correction induces a thinning out of the photo-electric peak and a greater definition of the seperation between the photoelectric peak and the Compton quanta.

At a high frequency (see FIG. 8), the uncorrected spectrum is significantly deformed due to the pile-up effect; so much so as to no longer permit discrimination between the photo-electric peak and the Compton quanta. In contrast thereto, the corrected spectrum is still regular and has well defined components.

Figure 9:
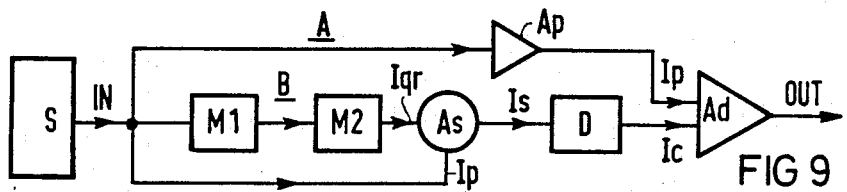
FIG. 9 represents a block circuit diagram of still another embodiment of the devices of FIGS. 1a and 1b.

An alternative to the circuits of FIG. 1 is illustrated in FIG. 9 and will be explained with reference to FIGS. 10a through 10f of the drawings.

This alternative also comprises a first and second branch A and B, respectively.

The Ip pulses (see FIG. 10a) leaving the scintillation detection system S are provided to control two monostable multi-vibrators M1, M2, which are connected in cascade or series, in order to generate square pulses Iqr (see FIGS. 10b, 10c) with a delay r of several nanoseconds from the apex of each pulse Ip. This signal Iqr opens the "door" of an analog-switch AS, the input of which is connected to the scintillation detection system S to receive the signal originating therefrom. A sample Is (see FIG. 10d) of the signal Ip to be corrected is obtained by this procedure at the output of switch As. With the samples Is of such amplitudes, exponential signals Ie (see FIG. 10e) with a time constant similar to that of the crystal plate multiplier assembly of the scintillation counter are produced by means of a signal deriving or signal forming stage D. The pulses of the artificial exponential signals Ie are analogous to the original pulses (see FIG. 10a). They are delayed by a delay time r.

Subsequently, by means of a differential amplifier Ad, it is sufficient to subtract the original signal Ip (amplified by an amplifier Ap in the first branch A) from the re-formed or artificial exponential signal Ie formed int he second branch B to obtain short pulses Ic (see FIG. 10f) having a corresponding amplitude. From FIG. 10f it will be noted that the main part of the pile-up effect has been removed. Thus, these corrected pulses can be easily and reliably analyzed and counted.

There have thus been shown and described a novel method and novel devices for dealing with pile-up pulses which method and devices fulfill the objects and advantages sought. Many changes, modifications, variations and other uses and applications of the subject invention will, however, become apparent to those skilled in the art after considering this specification and the accompanying drawings which disclose embodiments thereof. All such changes, modifications, variations and other uses and applications which do not depart from the spirit and scope of the invention are deemed to be covered by the invention which is limited only by the claims which follow.

I claim:

1. A method for overcoming the pile-up effect in a scintillation detection system which produces original electrical pulses in response to impinging radiation, comprising the steps of:
   (a) deriving from each original electrical pulse a low-pass filtered and delayed version thereof, said version having, with respect to its corresponding original electrical pulse, a delayed rising wavefront and an otherwise substantially similar waveform; and
   (b) performing subtractions between original electrical pulses and corresponding delayed versions thereof, thereby forming differential output pulses.

2. The method of claim 1, wherein said deriving step is carried out in a manner that said delayed versions are delayed on the order of several nanoseconds.

3. The method of claim 1, further comprising the steps of analyzing and counting said differential output pulses.

4. A method for overcoming the pile-up effect in a scintillation detector systems which produces original electrical pulses in response to impinging radiation, comprising the following steps:
   (a) deriving delayed artificial square-wave pulses from said original pulses; and
   (b) performing subtractions between original pulses and corresponding artificial pulses, thereby forming differential output pulses.

5. A device to overcome the pile-up effect in a scintillation detection system which delivers electrical pulses in response to impinging high energy radiation, comprising a ring circuit having
   (a) a first branch for receiving and emitting said electrical pulses in real time,
   (b) a second branch including a delay member for receiving said electrical pulses and for issuing respective delayed electrical pulses, and
   (c) a differential amplifier having a first and a second input, said inputs being connected to the outputs of said first and second branches, respectively, and said differential amplifier having an output for issuing differential output signal pulses.

6. The device according to claim 5, wherein said delay member comprises a low pass filter to obtain said delayed pulses, said delayed pulses having an identical amplitude and shape, but a delay of their wave front rises with respect to said respective electrical pulses.

7. The device according to claim 5, wherein said delay member is an amplifying delay member and includes a rapid amplifier.

8. The device according to claim 5, wherein said differential amplifier is a rapid differential amplifier.

9. The device according to claim 5, wherein said first branch includes a rapid amplifier.

10. The device according to claim 5, wherein said first branch includes a rapid amplifier and wherein said second branch includes a slow amplifier.

11. The device according to claim 5, wherein said output of said differential amplifier is connected to a counting device via pulse analyzing means.

12. A device to overcome the pile-up effect in a scintillation detection system which delivers electrical pulses in response to impinging high energy radiation, comprising a ring circuit having
    (a) a first branch for receiving and issuing said electrical pulses in real time,
    (b) a second branch for forming a sample of the amplitude, delayed by a delay time, with respect to the original electrical pulses and including a deviator for generating respective exponential signals similar to the original electrical pulses, and
    (c) a differential amplifier having its inputs connected to said branches, respectively, said amplifier performing a subtraction operation between the original electrical pulses and said respective reformed signals and issuing differential output signal pulses.

13. The device according to claim 12, wherein said second branch includes two multi-vibrators connected in series with respect to each other.

14. The device according to claim 12, wherein said differential output pulses are applied to a counter via an analyzer.

15. A device for detecting scintillation occurences, comprising in combination:
    (1) a scintillation crystal for being exposed to high energy radiation, said scintillation crystal emitting flashes of light when said high energy radiation impinges thereon,
    (2) at least one photomultipler associated with said scintillation crystal for detecting said flashes of light, said photomultipler generating electrical pulses in accordance with said flashes of light, and
    (3) electrical circuitry, comprising
        (a) a rapid amplifier for receiving said electrical pulses and for generating first amplified output signals,
        (b) an amplifying delay member for receiving said electrical pulses and for generating second amplified output signals, said second output signals having a delay with respect to said first output signals, and
        (c) a rapid differential amplifier for receiving said first and second output signals and for subtracting said second output signals from said first output signals, said rapid differential amplifier thereby generating a differential output signal.

16. The device according to claim 15, wherein said amplifying delay member comprises a series connection of a delay member and a rapid amplifier.

17. The device according to claim 15, wherein said amplifying delay member comprises an amplifier which is slow in processing said electrical pulses, thereby generating a delay in the rise time of said pulses.

18. The device according to claim 15, wherein said differential output signal is supplied to the input of an electrical counting device via analyzing circuitry.

19. The device according to claim 16, wherein said delay member is a low pass filter.

* * * * *